(12) United States Patent
Johansson et al.

(10) Patent No.: US 12,455,550 B2
(45) Date of Patent: Oct. 28, 2025

(54) METHOD FOR GENERATING CONTROL COMMAND DATA FOR CONTROLLING A CNC-LATHE

(71) Applicant: AB SANDVIK COROMANT, Sandviken (SE)

(72) Inventors: Adam Johansson, Sandviken (SE); Ronnie Lof, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 445 days.

(21) Appl. No.: 17/435,108

(22) PCT Filed: Feb. 6, 2020

(86) PCT No.: PCT/EP2020/052922
§ 371 (c)(1),
(2) Date: Aug. 31, 2021

(87) PCT Pub. No.: WO2020/177969
PCT Pub. Date: Sep. 10, 2020

(65) Prior Publication Data
US 2022/0128968 A1  Apr. 28, 2022

(30) Foreign Application Priority Data

Mar. 1, 2019 (EP) .................................. 19160337

(51) Int. Cl.
*G05B 19/409* (2006.01)
*G05B 19/4097* (2006.01)

(52) U.S. Cl.
CPC ............ *G05B 19/4097* (2013.01); *G05B 2219/36291* (2013.01); *G05B 2219/37358* (2013.01)

(58) Field of Classification Search
USPC ....................................................... 700/159
See application file for complete search history.

(56) References Cited

U.S. PATENT DOCUMENTS 9,817,390 B2    11/2017  Holt
2005/0126352 A1*  6/2005  Suh ................... G05B 19/4097
                                                      82/1.11

(Continued)

FOREIGN PATENT DOCUMENTS

EP   3153257 A1    4/2017
JP   3260225 A1 * 12/2017

(Continued)

*Primary Examiner* — Hien D Khuu
(74) *Attorney, Agent, or Firm* — Corinne R. Gorski

(57) ABSTRACT

A method for generating control command data for controlling a CNC-lathe to perform a turning operation by means of a turning tool. The method includes the steps of: generating control command data for commanding the turning tool to go into cut at a point of the unmachined inner surface, which is most far away from the end position; and commanding the turning tool to move along the inner surface towards the end position until either: the turning tool reaches the end position, or a cutting depth is equal to or greater than one of either: the maximum allowed cutting depth or the recommended cutting depth, whereby the turning tool is commanded to move away from the inner surface; or the turning tool reaches a predefined position, whereby the turning tool is commanded to move away from the inner surface.

17 Claims, 12 Drawing Sheets

(56) References Cited

U.S. PATENT DOCUMENTS

| | | | |
|---|---|---|---|
| 2013/0218319 A1* | 8/2013 | Holt | G05B 19/4163 82/1.11 |
| 2016/0089760 A1 | 3/2016 | Asano et al. | |
| 2017/0100776 A1* | 4/2017 | Lof | B23B 27/1644 |
| 2018/0181108 A1 | 6/2018 | Nagano | |

FOREIGN PATENT DOCUMENTS

| | | |
|---|---|---|
| JP | 2018106417 A | 7/2018 |
| JP | 2018530445 A | 10/2018 |

* cited by examiner

METHOD FOR GENERATING CONTROL COMMAND DATA FOR CONTROLLING A CNC-LATHE

RELATED APPLICATION DATA

This application is a § 371 National Stage Application of PCT International Application No. PCT/EP2020/052922 filed Feb. 6, 2020 claiming priority to EP 19160337.2 filed Mar. 1, 2019.

TECHNICAL FIELD OF THE INVENTION

The present invention belongs to the technical field of metal cutting. More specifically the present invention belongs to the field of generating control command data for controlling a CNC-lathe to perform a turning operation by means of a turning tool.

BACKGROUND OF THE INVENTION AND PRIOR ART

The present invention refers to a method to generating control command data for controlling a CNC-lathe. Turning is a form of metal cutting, which commonly is made using a computerized numerical control (CNC) lathe. A metal blank is clamped be clamping means, such as jaws, and the metal blank is rotated by means of a spindle. The CNC-lathe typically comprises one or more machine interfaces, to which turning tools can be removably clamped. The turning tool commonly comprise a turning insert, typically made from a wear resistant material such as cemented carbide. During the actual cutting, the turning tool is moved in relation to the metal work piece. This relative movement is called feed. The movement of the turning tool can be in a direction parallel to a rotational axis of the metal blank, this is commonly called longitudinal feed or axial feed. The movement of turning tool can furthermore be in a direction perpendicular to the rotational axis of the metal blank, this is commonly called radial feed or facing. Other angles of movement, or feed directions, are also possible, this is commonly known as copying or copy turning. The sequence from going into cut to going out of cut is known as a pass. The total of the passes made by one specific turning tool for removing a volume of material from a metal blank can be called a tool path. The tool path corresponds to the instructions or commands. Normally, a volume of material can be removed in many ways. For example, the commands may differ with respect to factors such as feed direction, cutting depth, feed, cutting speed. Although a volume of material can be removed in numerous ways, not all ways are equal with respect to factors such as machining time, tool life, chip breaking. There is therefore a need for guidance in how to wisely select the command data.

A method for generating control command data for controlling a CNC-lathe to perform a turning operation by means of a turning tool is described in US 2016/0089760 A1. In FIG. 4, it is explained that the cutting depth should be set to be a value greater than the nose radius of the turning insert.

However, the inventors have found that there is a further need to generate command data in order for improving the result of the metal removal.

SUMMARY OF THE INVENTION

It is a primary objective of the present invention to provide an improved method for generating control command data. Especially, one objective is to improve how to select cutting depths for improving a machining of a metal blank.

This objective is achieved according to a method for generating control command data for controlling a CNC-lathe to perform a turning operation by means of a turning tool, the method comprises the steps of: selecting a representation of a metal blank; selecting a representation of a turning tool; selecting a volume of material from the metal blank to be removed by means of the turning tool, said volume being limited by an inner surface and an outer surface, said metal blank being limited by a peripheral surface, wherein the peripheral surface comprises the outer surface; selecting an end position; selecting a recommended cutting depth for the turning tool; selecting a recommended allowed cutting depth for the turning tool; and, based on the above, generating control command data for: commanding the turning tool to go into cut at a point of the unmachined inner surface which is most remote, i.e. most far away, from the end position; and for (c) commanding the turning tool to move along the inner surface towards the end position until either the turning tool reaches the end position, or a cutting depth is equal to or greater than one of either the maximum allowed cutting depth or the recommended cutting depth, whereby the turning tool is commanded to move away from the inner surface, or the turning tool reaches a predefined position, whereby the turning tool is commanded to move away from the inner surface.

By such a method, a machined object and especially an inner surface can be machined through a turning operation in a shorter time. For example, by the fact that the turning tool is not commanded to move away from the inner surface unless the cutting depth reaches a certain value, the machining time can be reduced compared to if such a machining is made through several machining steps. By such a method, control command data can be generated for a variety of metal blanks for machining a variety of machined objects in an efficient manner.

The method is for generating control command data, such as NC-code (numerical control code), for controlling a CNC-lathe to perform a metal-working turning operation by means of a turning tool. In other words, the method is for generating a turning tool path for a CNC-lathe. In this context, a CNC-lathe is any CNC machine tool suitable to perform a turning operation by means of a turning tool. The CNC-lathe comprises a machine interface to which machine interface a turning tool is connected or connectable.

The method may include the step of importing an electronic CAD (computer aided design) model, such as a STEP-file or a IGS-file, of a machined object, i.e. a desired shape of the blank after the turning operation. In other words, the method may include the method of importing a representation of a machined object.

A representation of a metal blank is selected. A representation of the metal blank may preferably be imported, preferably in the form of a CAD model, such as a STEP-file (such as defined in e.g. ISO 10303-21) or a IGS-file. Said representation may preferably be obtained through a step of a geometry measurement of a physical metal blank, preferably by means of a coordinate measuring machine (CMM). The metal blank is limited by a peripheral surface.

A representation of a turning tool is selected. Preferably, the turning tool is selected from an electronic tool library which preferably is a representation of turning tools from a tool magazine connected to or part of the CNC-lathe.

Said turning tool may be selected manually or automatically.

Said turning tool is preferably selected with account taken to geometrical and other limitations such as the shape of the turning tool, the shape of the inner surface, the shape of the machined object, requirements for surface quality of the machined object, the orientation of the turning tool in relation to the metal blank, the orientation of the machine interface, the geometry of means for clamping the metal blank to a spindle of the CNC-lathe, the material of the metal blank etc.

The turning tool is selected to be suitable for machining in a direction from the below defined start position to the below defined end position, along the inner surface.

The turning tool preferably comprise a tool body and a turning insert mounted in an insert seat of the tool body. The tool body is mounted in or connected to the CNC-lathe.

The turning insert preferably comprises a first cutting edge, a second cutting edge and a convex nose cutting edge connecting the first and second cutting. Preferably, a nose angle formed between the first and second cutting edges is less than or equal to 85° in a top view. The nose cutting edge may have a shape of a circular arc or may have a shape that deviates slightly from a perfect circular arc. The nose cutting edge preferably has a radius of curvature of 0.2-2.0 mm. The first and second cutting edges are preferably straight in a top view. Alternatively, the first and second cutting edges can be slightly convex or concave, with a radius of curvature that is more than two times greater, and preferably more than ten times greater, than the radius of curvature of the convex nose cutting edge.

The inner surface is formed solely or at least to the greatest extent or at least partly by the nose cutting edge. The inner surface is a rotational symmetrical around a rotational axis.

The first cutting edge is preferably arranged or orientated to be active at an entering angle 17 of 10-45°, preferably 20-40°. The entering angle is the angle between the feed direction and the active cutting edge, which in this case is first cutting edge.

The entering angle may vary during the one and more passes where the volume of material is removed. However, the turning tool should preferably be arranged such that the entering angle is within the above intervals when machining the longest surface.

A volume of material from the metal blank to be removed by means of the turning tool is selected.

It is not necessary that said volume is selected after the turning tool is selected. In other words, the method may include the steps of selecting the turning tool prior to selecting the volume, or the method may include the steps of selecting the volume prior to selecting the turning tool.

Said volume being limited by an inner surface, where said machined object preferably comprises the inner surface, and an outer surface, wherein the peripheral surface of the metal blank comprises the outer surface. A distance from the machined object to the outer surface is greater than a distance from the machined object to the inner surface.

Said volume is selected such that said volume can be removed using the selected turning tool. Alternatively, formulated, the turning tool is selected such that said volume can be removed using the selected turning tool.

The turning operation is for removing at least a portion of said volume.

An end position is selected. The end position is defined as a point or section along the inner surface where the turning tool is positioned when said volume has been removed.

The end position is preferably selected such that the end position is at an end point of the inner surface. The inner surface preferably extends along a line between two points, when seen in cross section, as in e.g. FIG. 3. The other of said two points is preferably selected as the start position.

If the longest part surface of the inner surface is cylindrical, the end position is preferably selected as the one of said two points located closest to the rotational axis.

If the longest part surface of the inner surface is flat, i.e. perpendicular to the rotational axis, the end position is preferably selected as the one of said two points located most distant from the rotational axis.

A maximum cutting depth for the turning tool, i.e. a maximum allowed cutting depth for the turning tool, i.e. an upper threshold or upper threshold function for the turning tool, is preferably selected. The maximum cutting depth is the upper threshold or upper threshold function for the turning tool depending of a feed direction of the turning tool, taking the shape of the inner surface and the orientation of the turning tool into consideration. The maximum cutting depth can be understood as a distance away from and perpendicular to the inner surface.

The method includes the step of selecting a recommended cutting depth for the turning tool. Said recommended cutting depth may be equal to or preferably less than the maximum cutting depth for the turning tool.

The maximum cutting depth or upper threshold function may preferably be selected to correspond to a point along the first cutting edge or along the second cutting edge.

The maximum cutting depth may be selected to one specific value, for longitudinal turning in one direction of movement (feed direction), and a different value for longitudinal turning in an opposite direction. For one or more feed directions, the value may be zero. Thus, the maximum cutting depth can be understood as an upper threshold function which depend on the direction of feed.

The recommended cutting depth of the turning tool can be understood in a corresponding manner as the maximum allowed cutting depth of the turning tool.

When referring to the position of the turning tool, this should be understood as the position of the surface generating point or section of the turning tool. In other words, the position of the turning tool is the position of the nose cutting edge.

The turning tool is commanded to perform a turning pass by going into cut at a start position, defined as the point of the unmachined inner surface which is most far away from the end position. The turning tool is commanded to move along the inner surface towards the end position until one of the following criteria is fulfilled.

The turning tool reaches the end position, i.e. the inner surface is machined in one singular turning pass, and the cutting depth for this singular turning pass is always less than or equal to the maximum allowed cutting depth of the turning tool.

Alternatively, the turning tool during its movement along the inner surface reaches a point where the cutting depth is equal to or greater than the maximum cutting depth for the turning tool. Since the maximum allowed cutting depth of the turning tool is an upper threshold value, over which value the turning tool is forbidden to work, the movement of the turning tool along the inner surface is stopped. "The cutting depth is" in this context should therefore be understood as "the cutting depth reaches".

After the movement of the turning tool along the inner surface is stopped, the turning tool is commanded to move away from the inner surface, preferably in a predefined direction, thereby going out of cut. Said predefined direction is parallel to the longest cylindrical, flat or conical part surface of the inner surface, if the inner surface comprises such surfaces. Otherwise, the turning tool is commanded to move in a direction away from and perpendicular to the inner surface.

Alternatively, the turning tool during its movement along the inner surface reaches a point where the cutting depth is equal to or greater than the recommended cutting depth for the turning tool. and in an analogous way, the movement of the turning tool is stopped, and the turning tool is commanded to move away from the inner surface.

Alternatively, the turning tool is commanded to stop as the turning tool reaches a predefined position. Preferably, the cutting depth is greater than or equal to the recommended cutting depth of the turning tool as the turning tool reaches said predetermined position.

Such predefined position can be defined under the condition that the inner surface comprises one or more cylindrical, flat or conical part surfaces. An imaginary line, or base line, may be drawn intersecting the longest of said surfaces. Said predefined position is defined as an intersection between the inner surface and a line parallel to and spaced apart by a multiple of the recommended cutting depth of the turning tool from a base line, where said base line intersect the longest cylindrical, flat or conical part surface of the inner surface. After reaching said predefined position, the turning tool is commanded to move away from the said predefined position and away from the inner surface.

The method preferably comprises the step of arranging the turning tool such that the second cutting edge forms a back clearance angle which preferably is more than 90°, preferably more than 100°, during at least a portion of the turning pass. The second cutting edge is a trailing edge. In other words, the angle between the feed direction, i.e. the direction of movement of the turning insert, and the second cutting edge is preferably less than 90°, preferably less than 80°.

The moving away from the inner surface is preferably in a direction perpendicular to the inner surface or within +/−30° from perpendicular to the inner surface.

According to an embodiment, the method comprises the further step of: prior to step (b): (a) commanding the turning tool to remove a portion of the volume of material through one or more turning passes until a cutting depth at a point of the inner surface which is most far away from the end position is less than or equal to the maximum allowed cutting depth of the turning tool.

The method comprises the step of commanding the turning tool to remove a portion of the volume of material through one or more preferably parallel turning passes until a cutting depth at a start position, i.e. the point of the inner surface which is most far away from the end position, is less than or equal to the maximum cutting depth.

Said step is a roughing step. Said step includes machining of the peripheral surface of the metal blank.

Preferably, the turning tool is commanded to remove a portion of the volume of material until a cutting depth at a point of the inner surface which is most far away from the end position is less than or equal to the recommended cutting depth of the turning tool.

Preferably, said portion of the volume of material is removed through one or more turning passes which are linear and parallel to the longest part surface of the inner surface.

According to an embodiment, the method comprises the further step of: commanding the turning tool to during step (a) perform two or more turning passes; and selecting a maximum cutting depth for the first turning pass to be less than a maximum cutting depth for all subsequent turning passes during step (a).

By such a method, the tool life can be improved. Since the outer surface is part of the peripheral surface of the blank, machining this surface may lead to more tool wear. This is because that a skin of a blank may be harder and/or having a more uneven surface.

Preferably, said turning passes are successively closer to the inner surface. In other words, a volume of material removed during a subsequent turning pass is between the inner surface and a volume of material removed during a previous turning pass.

According to an embodiment, the method comprises the further step of: repeating step (c) until the turning tool reaches the end position.

By such a method, the machining can be made in a shorter time.

In other words, the method comprises the performing of one or more additional turning passes. In other words, the inner surface is formed through two or more turning passes.

According to an embodiment, the method comprises the further step of: selecting the turning tool such that a minimum cutting depth for the turning tool is less than the cutting depth during step (a) and (c).

By such a method, the machining can be made in a more trouble-free manner. For example, the chip breaking and/or chip control can be improved because the cutting depth is not below the recommended minimum cutting depth of the turning tool.

According to an embodiment, the method comprises the further step of: selecting the inner surface such that the inner surface comprises at least one part surface which is cylindrical, conical or planar.

The inner surface comprises at least one part surface or sub-surface which is either cylindrical, i.e. all points at a constant distance from the rotational axis of the metal blank; conical, i.e. all points at a linearly increasing or decreasing distance from the rotational axis of the metal blank; or planar, i.e. in a plane.

According to an embodiment, the method comprises the further steps of: during step (c), moving the turning tool in a direction which is parallel to or substantially parallel to the longest of the cylindrical, conical or planar part surface.

By such a method, the machining time may be reduced because the number of passes may be reduced.

The turning tool is moved in a direction parallel to or substantially parallel to the longest part surface during at least some portion of step (c). Said direction is preferably parallel to the base line. Said direction is preferably away from the inner surface. Preferably, said direction is parallel to the rotational axis.

According to an embodiment, the method comprises the further steps of: during step (a), commanding the turning tool to remove material through a sequence of parallel turning passes.

Said parallel turning passes or passes are preferably parallel to the base line. Preferably, the turning tool is moved in the same direction during at least most, preferably all the turning passes.

The moving of the turning tool is preferably along each of the lines, starting from the most outer line and moving inwards.

Preferably, the moving of the turning tool is in a direction away from the inner surface and towards the outer surface during at least most, preferably all the turning passes.

According to an embodiment, the method comprises the further step of: removing the volume of material by turning tool in a sequence of turning passes, wherein a maximum cutting depth for the turning pass associated with the base line is greater than a maximum cutting depth for the first turning pass.

The first turning pass is the turning pass associated with the most outer line.

According to an embodiment, the method comprises the further steps of: selecting a chip thickness value for the turning tool, and selecting a feed rate such that the feed rate is equal to the chip thickness value divided by the sinus function of an entering angle, where the entering angle is defined as an angle between a direction of feed and a main cutting edge of the turning tool.

By such a method, the tool life is improved.

Said chip thickness value may be selected manually, or may preferably be imported from a database, preferably with the material of the metal blank considered.

Said feed rate is a recommended feed rate for the turning tool.

In other words, the method comprises the step of commanding the turning tool to move in a speed in relation to the rotation of the metal blank and in relation to the direction of feed according to the calculation above.

According to an embodiment, the method comprises the further step of: reducing a feed rate when going out of cut.

By such a method, the tool life is improved.

The feed rate is thus reduced for at least one, preferably more than one turning pass. Feed rate is normally measured in millimeters per revolution. Preferably the reducing of feed rate starts between 1 and 10 mm, more preferably 2-8 mm, before going out of cut.

Preferably, the feed rate is reduced by 10-70%, more preferably 20-50%, compared to a feed rate before a selected feed rate, i.e. the feed rate before reduction.

According to an embodiment, the method comprises the further step of: during step (b), commanding the turning tool to go into cut along an arc By such a method, the tool life may be improved.

Preferably at least during step (b), the turning tool is commanded to move along an arc at the entry or start the cut, i.e. when going into cut. At least during step (b), said arc is preferably tangent to the inner surface and is preferably tangent to the direction which the turning tool moves away from the inner surface.

Preferably, said arc is a circular arc. Preferably, said circular arc has a radius of curvature thereof which is 1-10 mm, even more preferably 2-5 mm.

According to an embodiment, the method comprises the further step of: selecting the inner surface such that the inner surface comprises an 90° corner.

The nose angel of less than or equal to 85° give the advantage that a 90° corner, i.e. two wall surfaces being perpendicular to each other, can be machined with one nose portion of the turning insert, without any reorientation of the turning insert. The two wall surfaces comprise one flat surface which is perpendicular to the rotational axis, and one surface having a constant distance in relation to the rotational axis.

The method preferably comprises the step of commanding the turning tool to move away from said flat surface.

A 90° corner in this context is a 90° corner which preferably is an external corner formed on or at an external or outer surface of a metal work piece, such that the cylindrical wall or cylindrical surface, preferably along or parallel to the base line, is facing away from the rotational axis. This contrasts with any corner which may be formed on or at an internal or inner surface inside a bore concentric with the rotational axis. The circular or curved segment is in a cross section in a plane comprising the rotational axis in the shape of an arc, in the shape of a quarter of a circle or a quarter of a shape which is substantially a circle, which has the same radius of curvature as the nose cutting edge of the turning insert. The circular or curved segment alternatively has a greater radius of curvature than the nose cutting edge of the turning insert.

The method preferably comprises the step of commanding the turning tool to move away from said 90° corner.

According to an embodiment, the turning tool comprises a tool body and a turning insert mounted in an insert seat of the tool body, wherein the turning insert comprises a first cutting edge, a second cutting edge and a convex nose cutting edge connecting the first and second cutting edges, and wherein a nose angle formed between the first and second cutting edges is less than or equal to 85° in a top view.

The first cutting edge is an active cutting edge. The second cutting edge is an inactive cutting edge. The second cutting edge is inactive for all turning passes.

According to an embodiment, the nose cutting edge has a radius of curvature of 0.2-2.0 mm, and wherein the first and second cutting edges are straight in a top view.

According to an embodiment, the method comprises the further step of generating control command data for commanding the turning tool in all turning passes to move either radially, without longitudinal component, or in the same longitudinal direction.

In other words, all passes are either without longitudinal component, i.e. solely or purely radial, i.e. towards the rotational axis and perpendicular to the rotational axis, i.e. facing, or in the same direction longitudinally, i.e. with the same longitudinal component, i.e. in the same direction along the rotational axis. In the same direction longitudinally should therefore be understood as either profiling, comprising both a radial and a longitudinal component, or only with a longitudinal component, i.e. parallel to the rotational axis. To clarify, all turning passes are either radially or in the same longitudinal direction or a combination of thereof.

According to an embodiment, a computer program is provided comprising command data according to any of the above described methods.

According to an embodiment, a computer program is provided for generating command data by a method according to any of the above described methods.

DESCRIPTION OF THE DRAWINGS

The present invention will now be explained in more detail by a description of different embodiments of the invention and by reference to the accompanying drawings.

DETAILED DESCRIPTION OF EMBODIMENTS OF THE INVENTION

Figure 1:
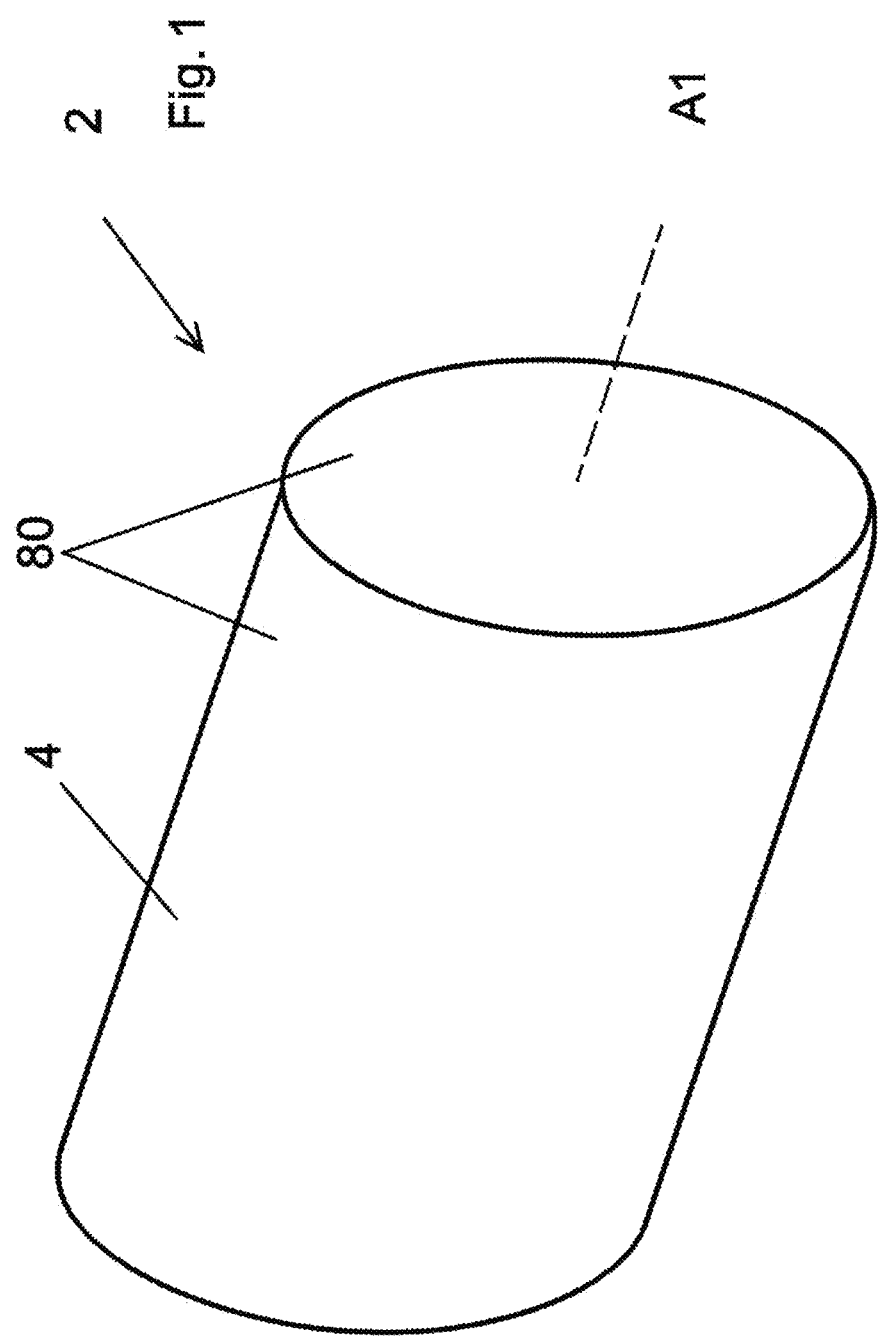
FIG. 1 is a perspective view showing a metal blank.

Reference is made to FIG. 1, which in a perspective view show a metal blank 2 being limited by a peripheral surface 80, and rotatable around a rotational axis A1. The metal blank 2 may be represented by a 3D model. The metal blank may be from cast material, or from a forged material. The metal blank may be a machined object. The metal blank may have a substantially cylindrical shape such as in FIG. 1 or may have any other shape. For example, the metal blank may comprise a hole, such as a hole concentric around the rotational axis. The peripheral surface 80 comprises an outer surface 4 which is a boundary surface or limit for a volume of material to be removed from the metal blank, thereby forming or generating a machined object.

Figure 2:
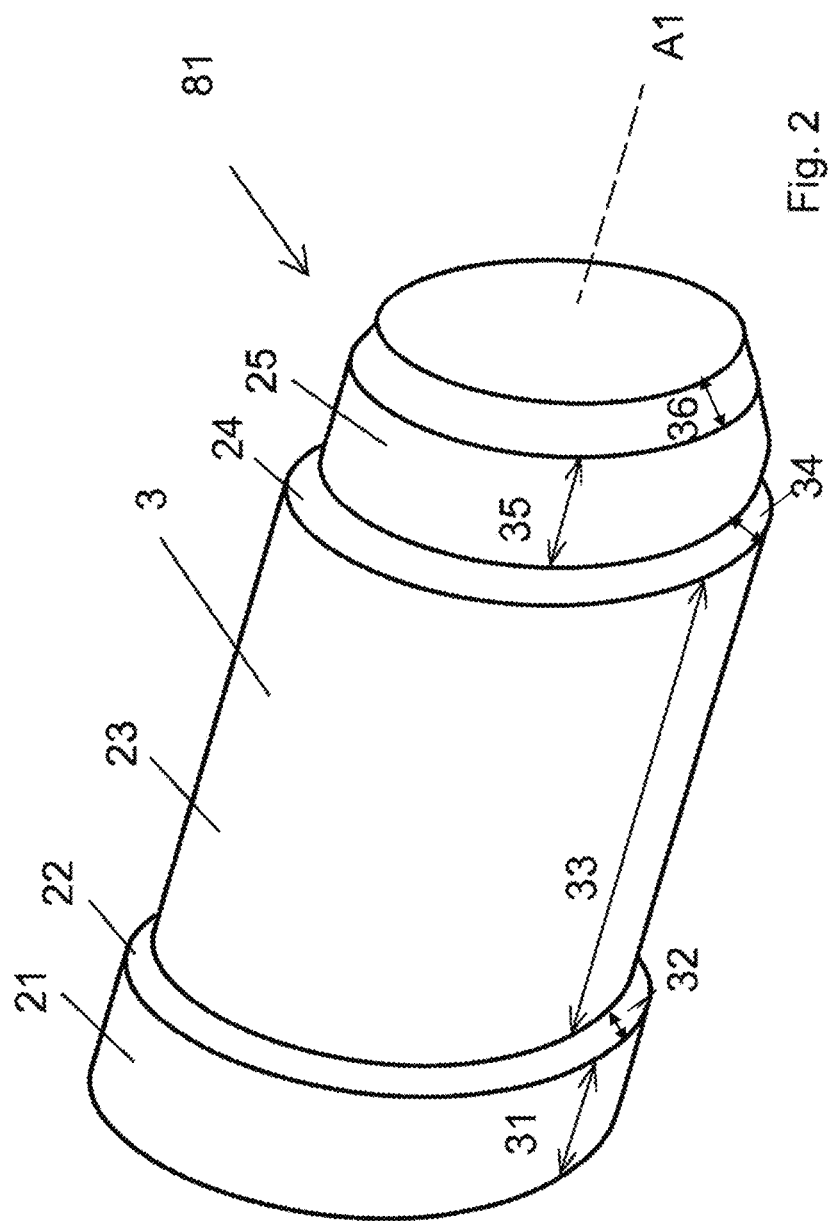
FIG. 2 is a perspective view showing a machined object.

Reference is now made to FIG. 2, which in a perspective view show a machined object 81 or a machined component. The machined object 81 may be represented by a 3D model. The machined object 81 is rotatable around a rotational axis A1 and is symmetrical around the rotational axis A1. The rotational axis A1 is the same for both the metal blank 2 and the machined object 81. The machined object 81 is made from the metal blank 2 through a turning process, i.e. a metal cutting process, and the volume of the machined object 81 smaller than the volume of the metal blank 2. The machined object 81 comprises an inner surface 3, where the inner surface 3 is a boundary surface or limit for a volume of material to be removed from the metal blank 2. The inner surface 3 comprises at least part surfaces 21-26 can be cylindrical as for part surfaces 21, 23 and 25, i.e. all points at a constant distance from the rotational axis A1 of the machined object 81. The part surfaces may be conical, i.e. all points at a linearly increasing or decreasing distance from the rotational axis of the metal blank, such as part surface 26. The part surfaces may be in a plane perpendicular to the rotational axis A1, such as part surfaces 22 and 24. The inner surface may comprise additional part surfaces, such as curved part surfaces.

For each of said part surfaces 21-26, a respective length 31-36 can be defined. Said length 31-36 is measured along a rotational axis A1 if the surface is cylindrical, see 31, 33, and 35; perpendicular to said rotational axis A1 if the surface is planar, see 32 and 34; and along the envelope surface and towards the rotational axis if the surface is conical, see 36. As can be seen, part surface 33 is the longest.

Figure 3:
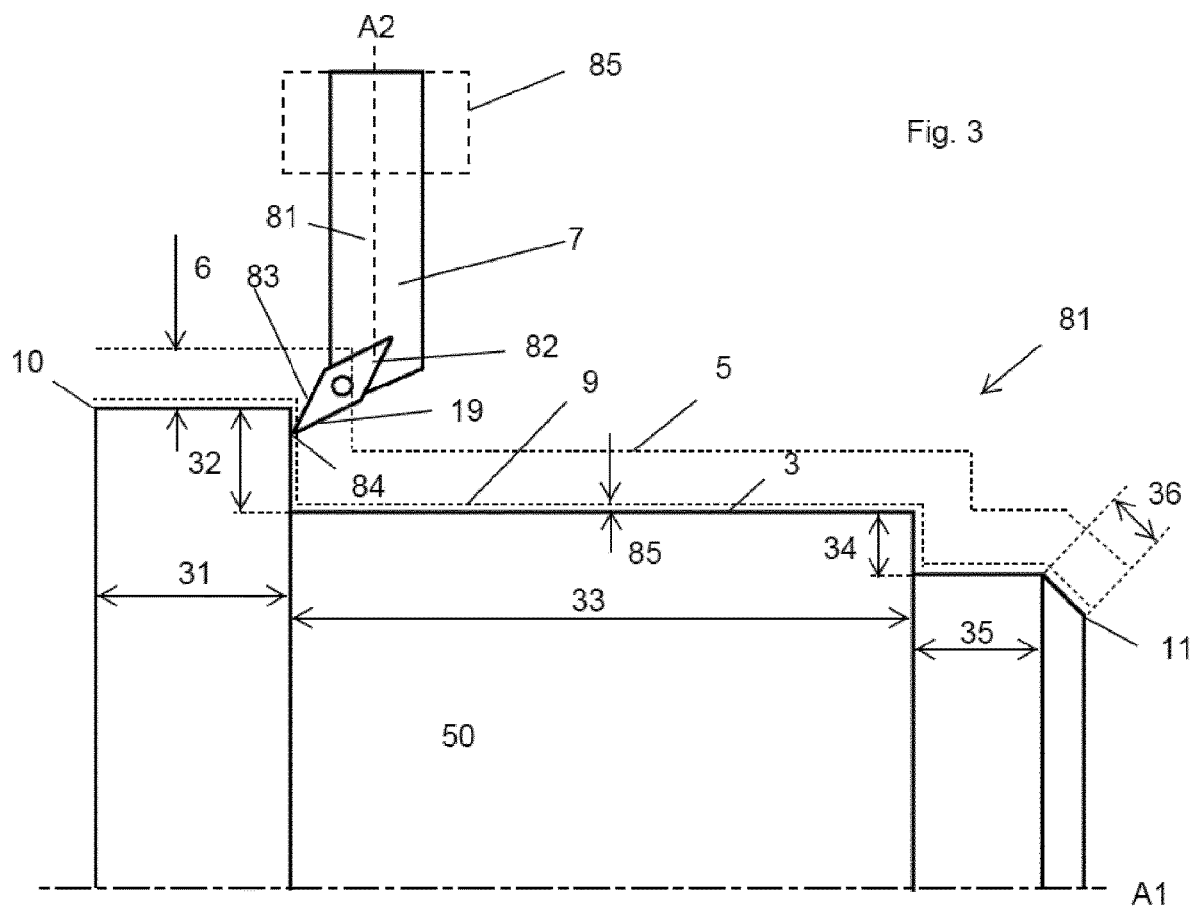
FIG. 3 is a side view showing the machined object in FIG. 2 and a turning tool.

Reference is now made to FIG. 3, which show a machined object 81 from FIG. 2 in a side view, as well as a turning tool 7 connected to a CNC-lathe (not shown) through a machine interface 85. The turning tool 7 comprise a tool body 81 and a turning insert 82 mounted in an insert seat of the tool body 81. The turning insert 82 comprises a main cutting edge 19, a secondary cutting edge 83, and a convex nose cutting edge 84 connecting the first and second cutting edges 19, 83. The nose cutting edge 84 generates the inner surface 3 of the machined object 81. The turning tool 7 comprises a front end and a rear end, whereby a longitudinal axis A2, i.e. a center axis, extends from the front end to the rear end. The rear end is connected to the machine interface. The front end comprises the insert seat. The longitudinal axis A2 is perpendicular to the axis of rotation A1 of the machined object 81.

The turning insert 82 is mounted in the insert seat such that a bisector extending equidistantly from the first and second cutting edges forms an angle of 35-55° in relation to the longitudinal axis A2 of the tool body.

In FIG. 3, the turning tool 7 is moved along the inner surface 3, generally towards the right-hand side, starting from the start position 10 and moving towards the end position 11.

The first cutting edge 19 is an active cutting edge. The second cutting edge 83 is an inactive cutting edge.

A distance from the longitudinal axis A2 of the turning tool 7 to the first cutting edge 19 is shorter than a distance from the longitudinal axis A2 of the turning tool 7 to the second cutting edge 83. Said distances are measured to corresponding points of the first and second cutting edge 19, 83, respectively, i.e. points at equal distances from the nose cutting edge 84.

A recommended cutting depth 5 for the turning tool 7 when machining the inner surface from the start position 10 to the end position 11 is illustrated as a dotted line 5. The recommended cutting depth can be understood as a distance 6 away from and perpendicular to the inner surface 3. Said distance 6 may or may not be constant in all directions, such as e.g. different distance horizontally compared to vertically.

In a corresponding manner, minimum cutting depth 9 for the turning tool 7 can be illustrated as a dotted line 9, and the minimum cutting depth 9 for the turning tool 7 can be understood as a distance 85 away from and perpendicular to the inner surface 3.

A maximum cutting depth for the turning tool 7 (not shown) may be understood in a corresponding manner.

Figure 4:
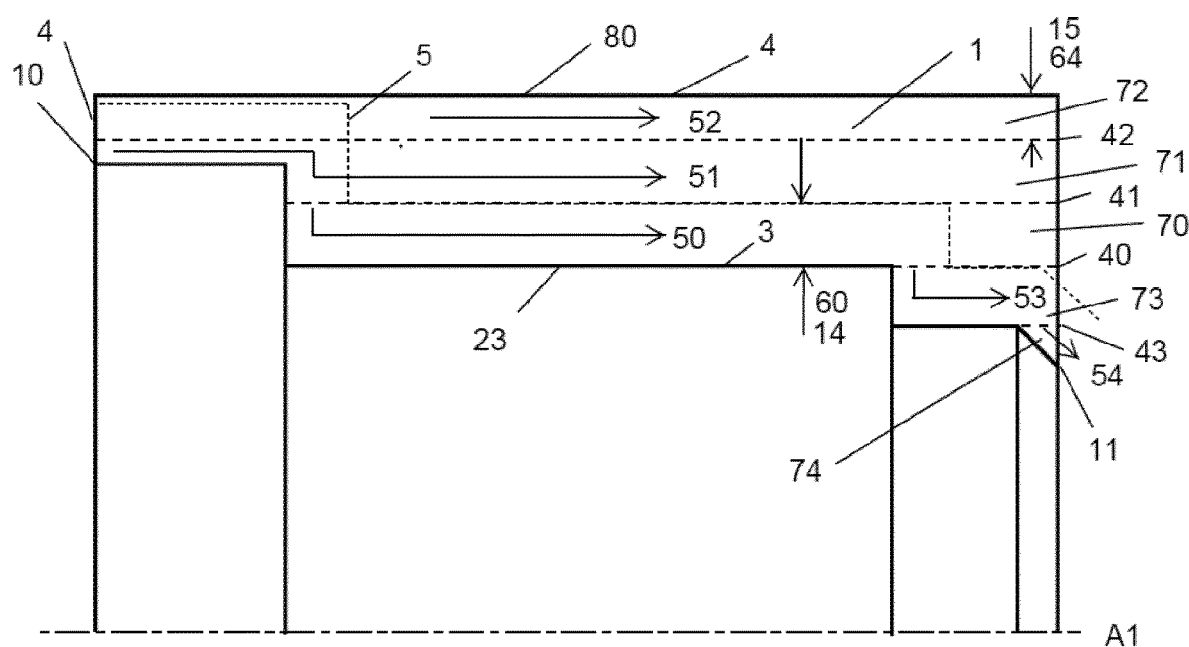
FIG. 4 is a cross section showing several passes where the machined object in FIG. 2 is formed from the metal blank in FIG. 1.

Reference is now made to FIG. 4, which show the machined object 81 from FIG. 3 machined using the turning tool (not shown) from FIG. 3. The orientation of the turning tool relative to the rotational axis A1 is as in FIG. 3. The machined object 81 is machined from the metal blank 2 showed in FIG. 1. A volume of material 1, limited by an outer surface 4 and an inner surface 3 is removed through several turning passes 52, 51, 50, 53, 54. A base line 40 is set such that the base line intersects the longest surface 23. Additional lines 41, 42, 43 within the volume of material 1 are added. Said lines 40-43 are parallel and spaced apart by a distance equal to the recommended cutting depth 5 of the turning tool 7. Said volume of material 1 is divided or partitioned into sub-portions 70, 71, 72, 73, 74, where said lines 40-43 represent borders between adjacent sub-portions 70-74. Each of said sub-portions 70-74 is removed through one respective turning pass 50-54, in the following order: 52, 51, 50, 53, 54. Passes 50-53 are all at least partly in the same direction, towards the right-hand side, and are at least partly parallel.

The base line 40 and an outer line 41 adjacent to the base line 40, i.e. the line next to the base line and perpendicular to the longest surface 23, is spaced apart by a distance 14 which distance 14 is greater than a perpendicular distance 15 between the most outer line 42 and the outer surface 4.

A maximum cutting depth 60 for the turning pass 50 associated with the base line 40 is greater than a maximum cutting depth 64 for the first turning pass 52.

When machining the inner surface, i.e. passes 51, 50, 53, 54, the turning tool (not shown) is commanded to go into cut at the start position 10, i.e. the point of the unmachined inner surface 3 which is most far away from the end position 11. The turning tool 7 is in pass 51 commanded to move along the inner surface 3 towards the end position 11. The movement in pass 51 is first longitudinal, towards the right-hand side, then radial, downwards in the figure. As the turning tool, or more specifically the nose cutting edge, reaches a predefined position in the form of an intersection between a line 41 and the inner surface 3, the turning tool is commanded to move away from the inner surface. The turning tool is commanded to move along the line 41, towards the right-hand side, until going out of cut.

After pass 51, pass 50 starts at said predefined point where in pass 51 the turning tool stopped the movement thereof along the inner surface. In pass 50, the turning tool is moved along the inner surface 3, first downwards in FIG. 4, then towards the right-hand side along the base line 40 until going out of cut. The turning tool is moving away from a 90° corner when moving parallel to the rotational axis A1.

After pass 50, in pass 53 the turning tool moves towards the rotational axis, followed by a direction away from a 90° corner and towards the right-hand side, along the inner surface, then away from the inner surface and along line 43. The last pass 54 is along the inner surface, more specifically along the conical part surface designated 26 in FIG. 2. After the two last passes 53, 54, the machining of the inner surface 3 is complete.

Figure 5:
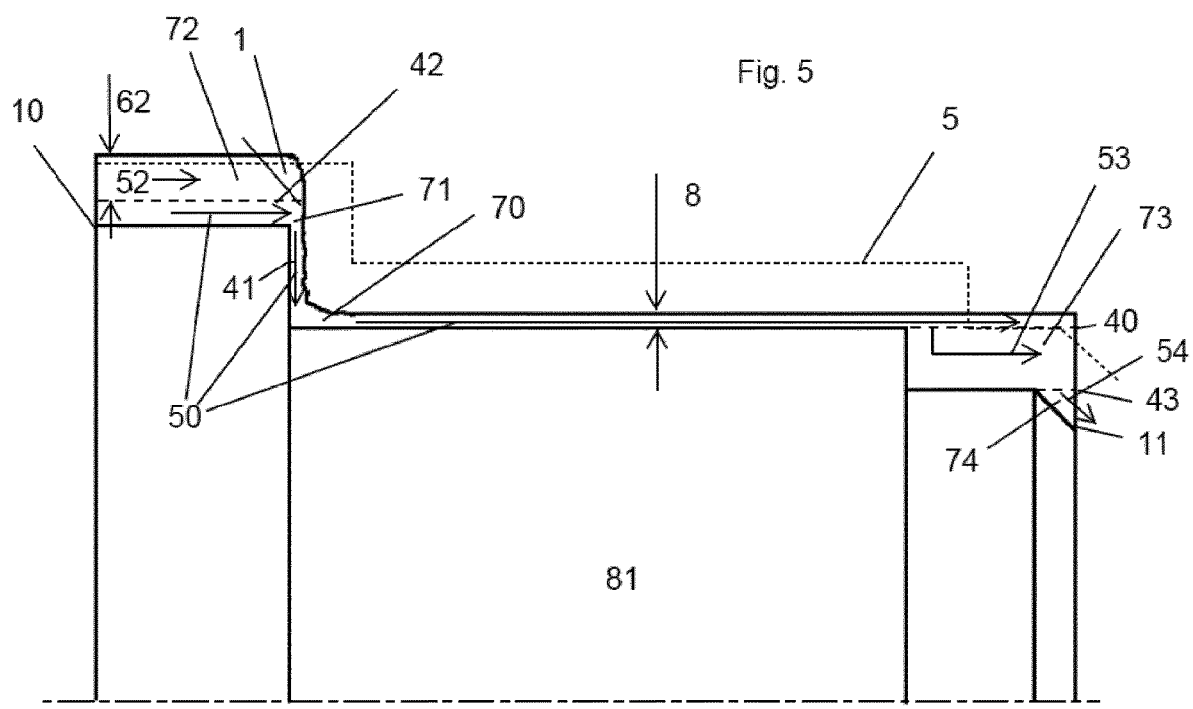
FIG. 5 is a cross section showing several passes where the machined object in FIG. 2 is formed from a metal blank.

Reference is now made to FIG. 5, which is identical to FIG. 4 except that the turning passes are slightly different because the volume of material is different compared to FIG. 4. In other words, the shape of metal blank 81 is different compared to FIG. 4, and as a result, the machining sequence or the tool paths differ. As in FIG. 4, first a portion of the volume of material 1 is removed by means of the turning tool through a first turning pass 52, which turning pass 52 is, as in FIG. 4, linear and parallel to the longest part surface 23 of the inner surface 3. As in FIG. 4, said pass 52 is along a line 42. Said lines 40, 41, 42, 43 are spaced apart in a corresponding manner as in FIG. 4, i.e. by a distance equal to the recommended cutting depth 5 of the turning tool 7. The maximum cutting depth 62 during the first turning pass 52 is smaller than a maximum cutting depth, equal to the recommended cutting depth 5 for the turning tool, for a subsequent turning pass 53.

Following the first pass 52, in the subsequent turning pass 50 the turning tool starts at the start point 10 and moves along the inner surface 3 until a cutting depth 8 is greater than the recommended cutting depth 5 of the turning tool, and until the turning tool reaches a predefined position in the form of an intersection between a line 40 and the inner surface 3. The turning tool is then commanded to move away from the inner surface 3, along the baseline 40, towards the right-hand side, until going out of cut. The last two passes 53, 54 are carried out as in FIG. 4.

Figure 6:
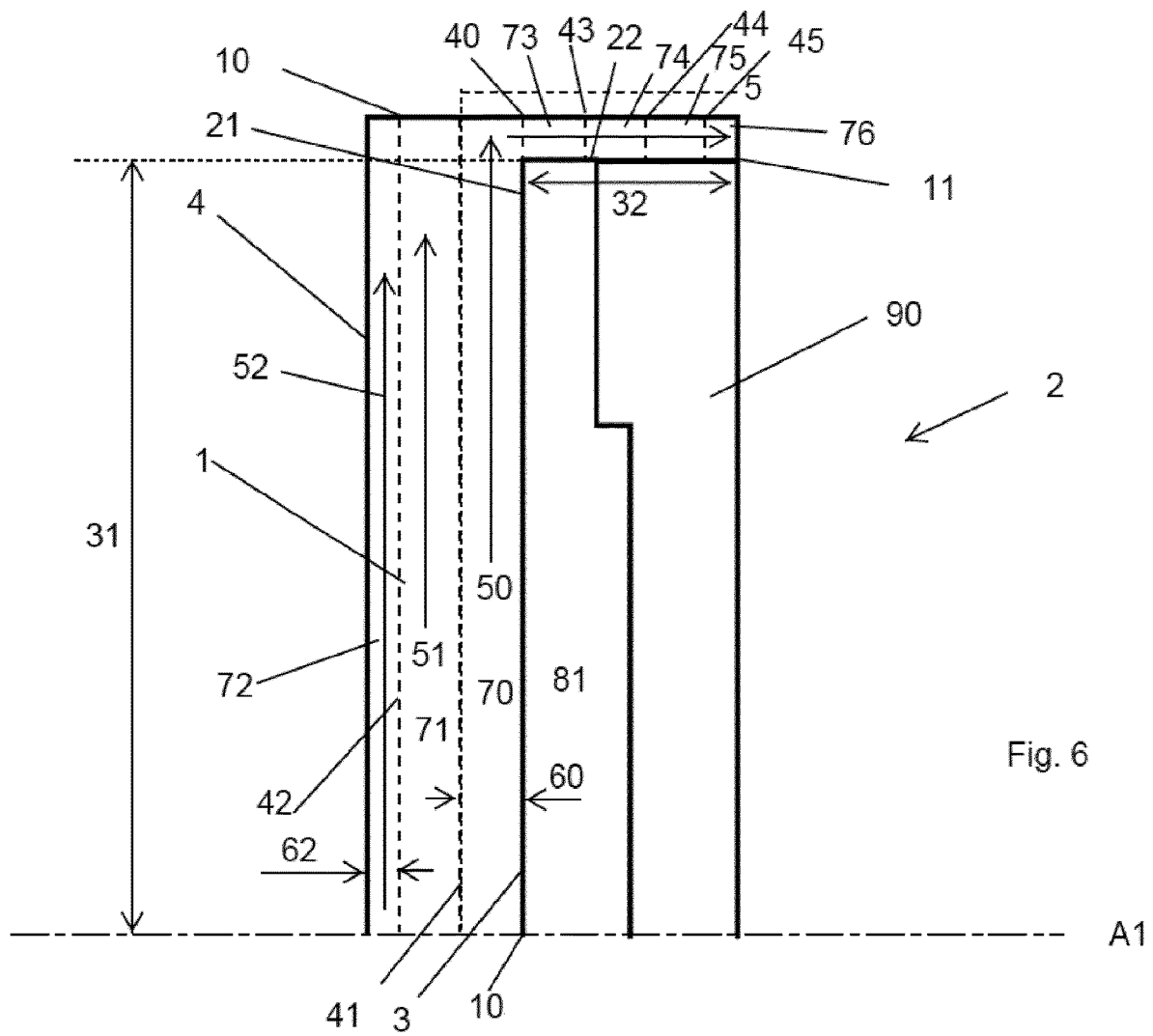
FIG. 6 is a cross section showing several passes where a machined object is formed from a metal blank.

Reference is now made to FIG. 6, which show a metal blank 2 from which a machined object 81 is formed, through removal of a volume of material 1, followed by a removal of an additional volume of material 90. The first mentioned volume of material 1 is removed by a turning tool (not shown), which turning tool preferably has a longitudinal axis thereof oriented parallel to the axis of rotation A1 of the machined object 81. The inner surface 3 of the volume of material 1 comprises two part surfaces 21, 22, where the flat part surface 21 is the longest. The flat part surface 21 is as can be seen in FIG. 6 located in a plane perpendicular to the rotational axis A1. A base line 40 is drawn such that the base line intersects the longest part surface 21. Additional lines 41, 42, 43, 44, 45 are drawn within the volume 1 of material, parallel to the base line 40, and such that adjacent lines are spaced apart by a distance equal to the recommended cutting depth 5 of the turning tool. Said lines 40-45 divide said volume 1 into sub portions 70-75. In other words, said lines 40-45 represent borders between adjacent sub portions 70-75. The first pass 52 is linear and parallel to the base line 40, wherein a maximum cutting depth 62 of the first pass 52 is smaller than the recommended cutting depth 5 of the turning tool. The subsequent pass 51 is likewise linear and parallel to the base line 40, but the cutting depth is equal to the recommended cutting depth 5 of the turning tool. In the next and final pass 50, the turning tool is commanded to start at the start point 10 and move along the inner surface 3 until the end point 11. During the final pass 50, the cutting depth equal to or less than the recommended cutting depth of the turning tool.

Figure 7:
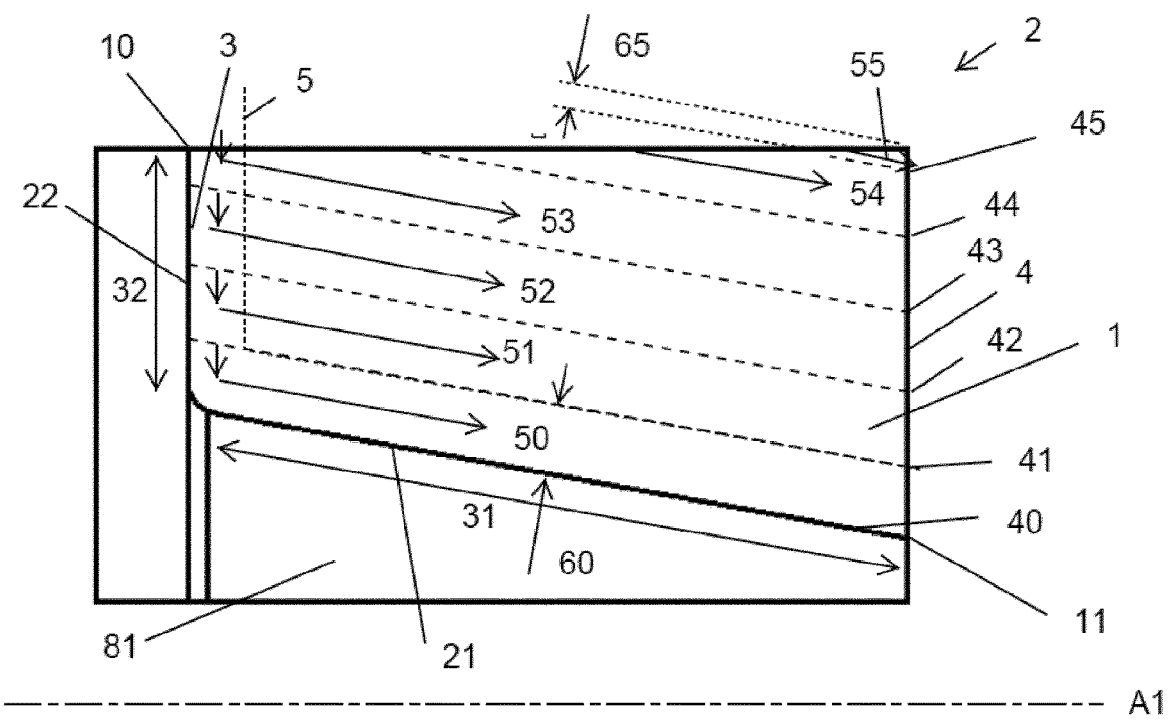
FIG. 7 is a cross section showing several passes where a machined object is formed from a metal blank.

Reference is now made to FIG. 7, which show a metal blank 2 from which a machined object 81 is formed, through removal of a volume of material 1 by means of a turning tool (not shown). The turning tool may preferably be the turning tool shown in FIG. 3, and the turning tool may preferably be oriented as the turning tool in FIG. 3, i.e. having a longitudinal axis thereof oriented perpendicular to the axis of rotation A1 of the machined object 81. The inner surface 3 comprises one flat part surface 22 and one conical part surface 21. The flat part surface 22 is in a plane perpendicular to the rotational axis A1. The length 31 of the conical part surface 21 is greater than the length 32 of the flat part surface 22. A base line 40 is drawn along the conical part surface 21. Additional lines 41-45 are arranged inside the volume of material 1, parallel to the base line 40, and such that adjacent lines are spaced apart by a distance equal to the recommended cutting depth 5 of the turning tool. Said lines 41-45 represent borders between adjacent sub-portions of said volume of material 1. Each of said sub-portion is removed through a respective turning pass 50-55. Said turning passes 50-55 are at least partly parallel and at least partly in the same direction, more specifically in a direction away from the flat part surface 22. A maximum cutting depth 65 for the first pass 55 is greater than is less than the maximum cutting depth for all subsequent passes 50-54. Lines 41-43 intersect the inner surface at points which represent predefined positions. During passes 51-53, as the turning tool reaches such a predefined position, the turning tool is commanded to move away from the inner surface and away from said predefined position, along the respective line 41-43.

Figure 8:
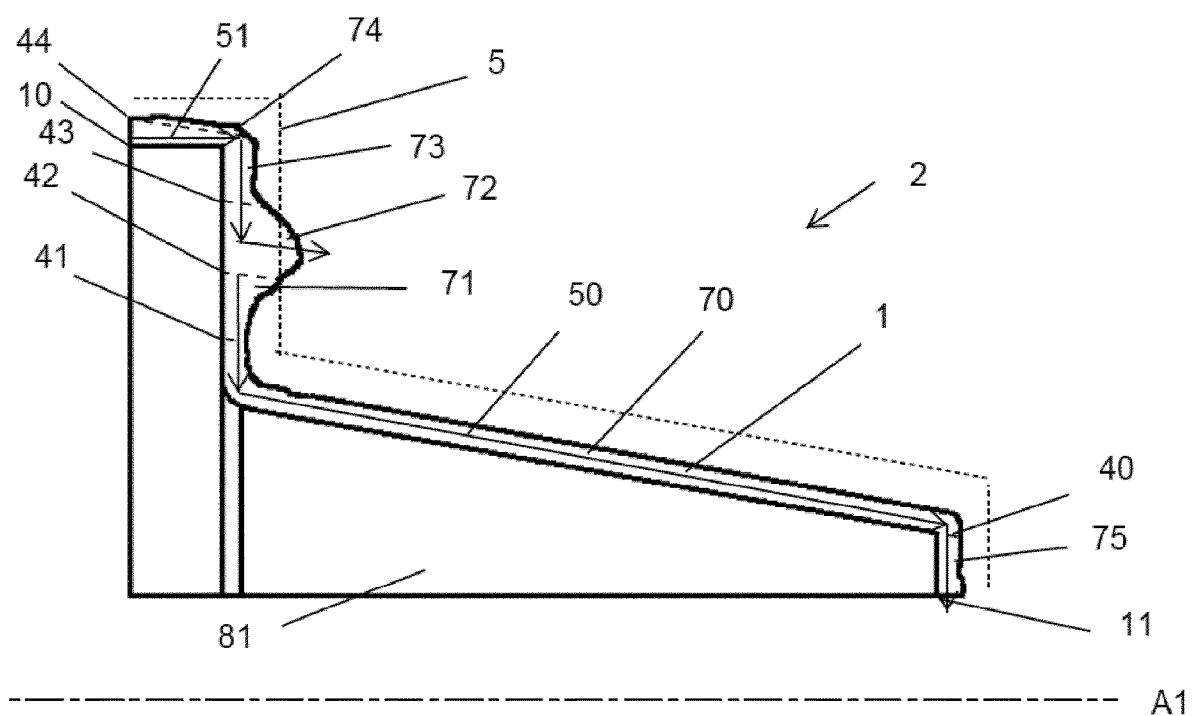
FIG. 8 is a cross section showing several passes where a machined object is formed from a metal blank.

Attention is now drawn to FIG. 8, which show a metal blank 2 from which a machined object 81 is formed, through removal of a volume of material 1 by means of a turning tool (not shown). FIG. 8 differs from FIG. 7 in that the shape of the metal blank 81 is different, and as a result, the machining sequence or the tool paths, i.e. the sum of the passes differs.

A base line 40 and lines 41-44 are drawn within the volume of material 1 to be removed in a corresponding manner as for FIG. 7.

The turning tool is in pass 51 commanded to go into cut at the start position 10 and move along the inner surface 3. Between lines 43 and line 42, the cutting depth is above the recommended cutting depth, but below a maximum allowed cutting depth of the turning tool. As the turning tool reaches the intersection between line 42 and the inner surface 3, the turning tool is commanded to move away from said intersection along the line 42, thereby going out of cut. In the next pass 50, the turning tool is commanded to go into cut where the turning tool was commanded to move away from the inner surface during the first pass 51, i.e. at the intersection between line 42 and the inner surface 3. The turning tool is commanded to move along the inner surface 3 towards the end point or end position 11. During pass 50, the cutting depth is never equal to or greater than the recommended cutting depth 5 of the turning tool.

As can be understood from the examples given in FIGS. 4-8, the inner surface and the outer surface can have several shapes, depending on e.g. the shape of the metal blank and the shape of the machined object. Therefore, it is preferred to provide a method for generating control command data for controlling a CNC-lathe to perform a turning operation by means of a turning tool, where the method comprises the steps of: selecting a representation of a metal blank; selecting a representation of a turning tool; selecting a recommended cutting depth for the turning tool; selecting a volume of material from the metal blank to be removed by means of the turning tool, where said volume is limited by an inner surface and an outer surface, where said metal blank is limited by a peripheral surface, where the peripheral surface comprises the outer surface; and, based on the above, generating control command data for a machining strategy as a result of: (I) the recommended cutting depth of the turning is below or equal to the cutting depth; (II) the recommended cutting depth of the turning tool is above the cutting depth; or (III) the recommended cutting depth of the turning tool is altering between below and above cutting depth.

Given that (II) the recommended cutting depth of the turning tool is above the cutting depth, the method preferable comprising the further step of removing the volume of material by in a sequence making turning passes by moving the turning tool along parallel lines, starting from the most outer line. Said lines are preferably spaced apart by a distance equal to the maximum allowed cutting depth of the turning tool. Preferably, the above method comprising the further step of moving the turning tool in the same direction during at least most, preferably all the turning passes. Preferably, the above method comprising the further step of moving the turning tool in a direction away from the inner surface and towards the outer surface during at least most, preferably all the turning passes.

Given that (I) the recommended cutting depth is below or equal to the cutting depth, the method comprising the further steps of: selecting a start position and an end position and; moving the turning tool along the inner surface from the start position to the end position. Preferably, the above method comprising the further step of: selecting the start position and the end position such that a distance from a rotational axis of the metal blank to the start position is greater than a distance from the rotational axis of the metal blank to the end position.

Figure 9:
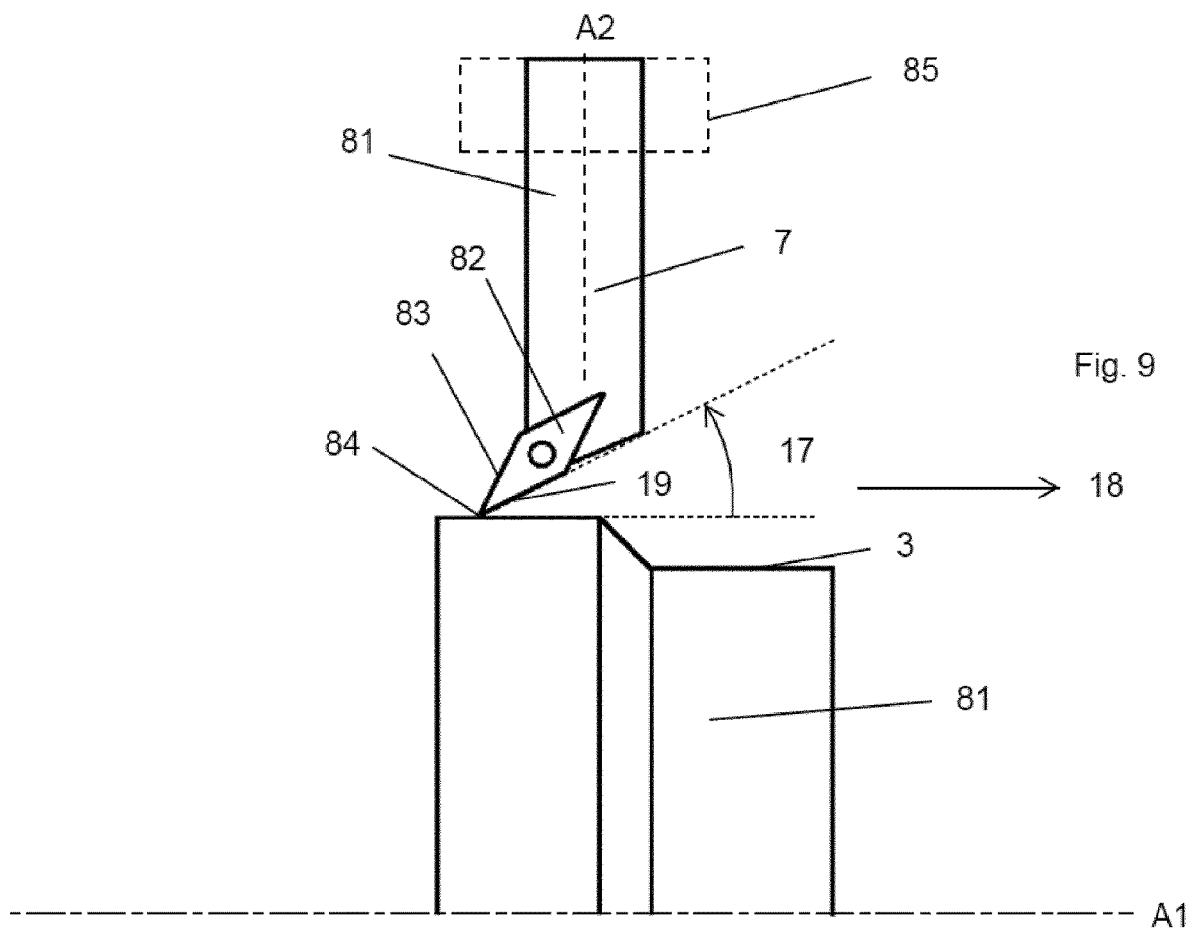
FIG. 9 is a side view showing a machined object and a turning tool.

Reference is now made to FIG. 9, which show a machined object 81 in a side view or in a cross section, as well as the turning tool 7 from FIG. 3. The turning tool is connected to a CNC-lathe (not shown) through a machine interface 85. The turning tool 7 comprise a tool body 81 and a turning insert 82 mounted in an insert seat of the tool body 81. The turning insert 82 comprises a main cutting edge 19, a secondary cutting edge 83, and a convex nose cutting edge 84 connecting the first and second cutting edges 19, 83. In a top view of the turning tool 7, as shown in FIG. 9, the turning insert 82 is symmetrical or substantially symmetrical relative to a bisector (not shown) extending between the first and second cutting edges 19, 83. The nose cutting edge 84 generates the inner surface 3 of the machined object 81. The turning tool 7 comprises a front end and a rear end, whereby a longitudinal axis A2, i.e. a center axis, extends from the front end to the rear end. During a turning pass, i.e. when removing material from the metal blank, an entering angle 17 is defined as an angle between a direction of feed 18, i.e. a movement of the turning tool 7, and a main cutting edge 19 of the turning tool 7. The first cutting edge 19 is arranged or orientated to be active at an entering angle 17 of 10-45°, preferably 20-40° when machining in a direction of feed 18 parallel to the base line (not shown).

Provided that the angle between the longitudinal axis A2 of the turning tool 7 and the rotational axis A1 is constant, changing the direction of feed 18 will lead to a change in entering angle 17. For example, in FIG. 9, when changing the direction of feed 18 from parallel to the rotational axis A1 to inclined relative to the rotational axis, i.e. the conical portion, the feed rate should be reduced because the entering angle is increased.

Preferably, a chip thickness value is selected for the turning tool 7, and the feed rate is selected such that the feed rate is equal to the chip thickness value divided by the sinus function of the entering angle 17.

Prior to going out of cut, preferably at a distance of 1-20 mm, even more preferably 3-10 mm, before going out of cut, the feed rate is reduced, preferably by 20-80%, even more preferably 40-70%. In other words, the turning tool is commanded to move in a slower pace prior to going out of cut.

Figure 10:
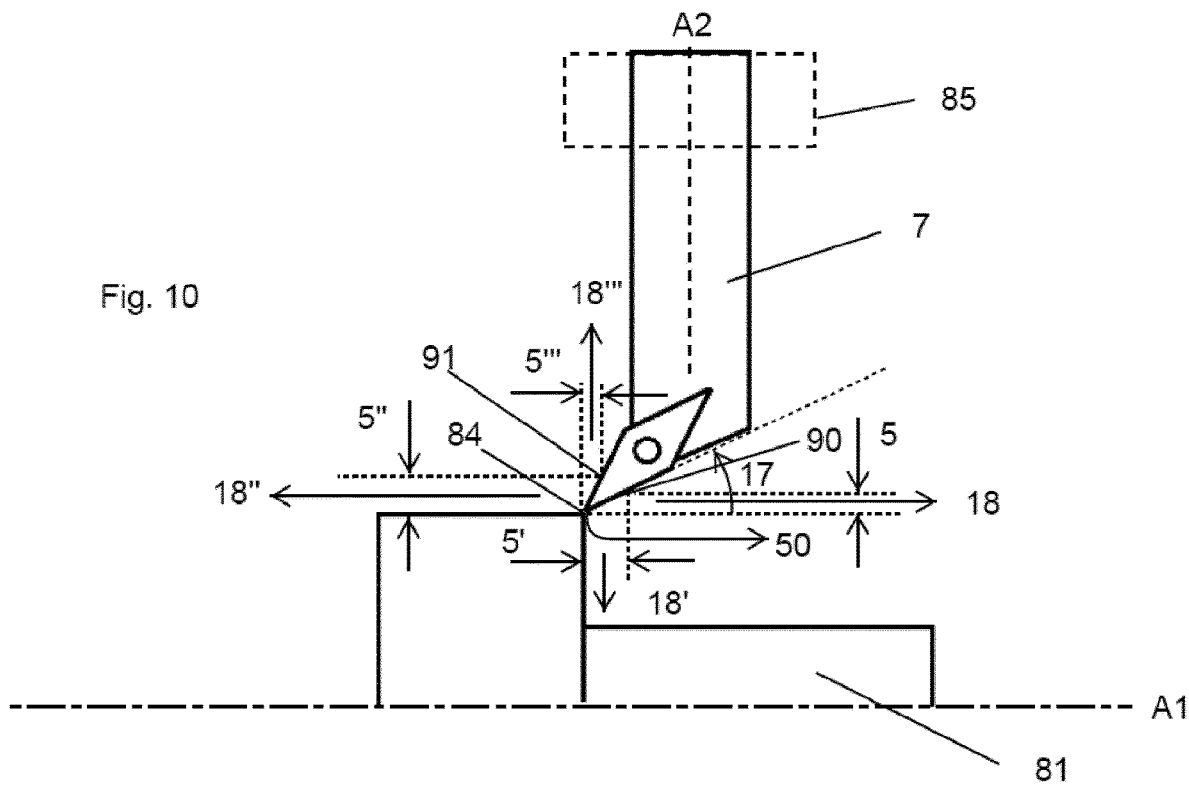
FIG. 10 is a side view showing a machined object and a turning tool.

Reference is now made to FIG. 10, which show a machined object 81 in a side view or in a cross section, as well as the turning tool 7 from e.g. FIGS. 3 and 9. The turning tool is connected to a CNC-lathe (not shown) through a machine interface 85. The turning tool 7 comprise a tool body 81 and a turning insert 82 mounted in an insert seat of the tool body 81. The direction of feed may be in different directions such as shown 18, 18', 18", 18'". Therefore, if the orientation of the longitudinal axis A2 is not changed, the entering angle may be different in depending of the direction of feed 18, 18', 18", 18'". The recommended cutting depth 5, 5', 5", 5'" for the turning tool 7 may be different depending of the 18, 18', 18", 18'". Preferably, the recommended cutting depth 5, 5', 5", 5'" for the turning tool 7 for the turning tool is selected to correspond to a point 90, 91 along the first or second cutting edge, respectively. Preferably, a minimum cutting depth for the turning tool and a maximum cutting depth for the turning tool, respectively, is selected in a corresponding manner.

Preferably, the turning tool 7 is commanded to move along an arc at the enter or start the cut, i.e. when going into cut, as seen in pass 50. Said arc is preferably tangent to the inner surface 3 and is preferably tangent to the direction (horizontally, towards the right-hand side) which the turning tool moves away from the inner surface 3. Said arc is a circular arc.

Figure 11:
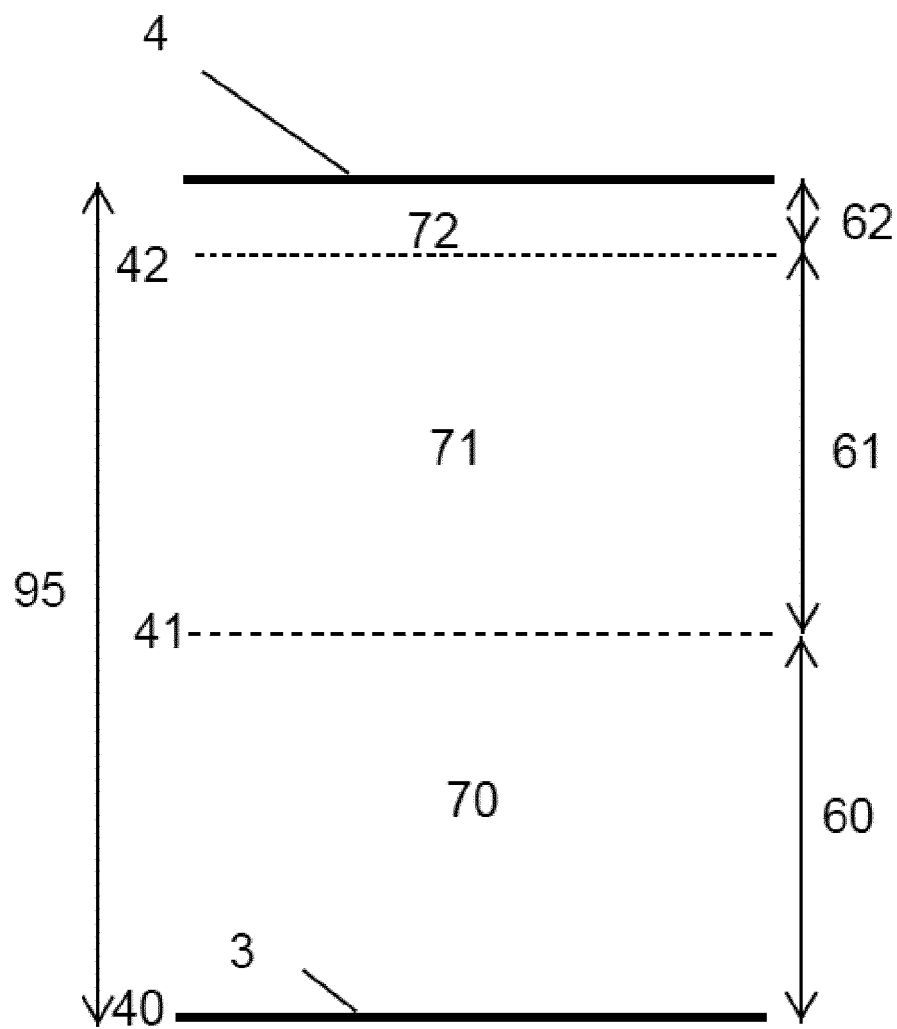
FIG. 11 is a cross section showing an inner surface and an outer surface.
Figure 12:
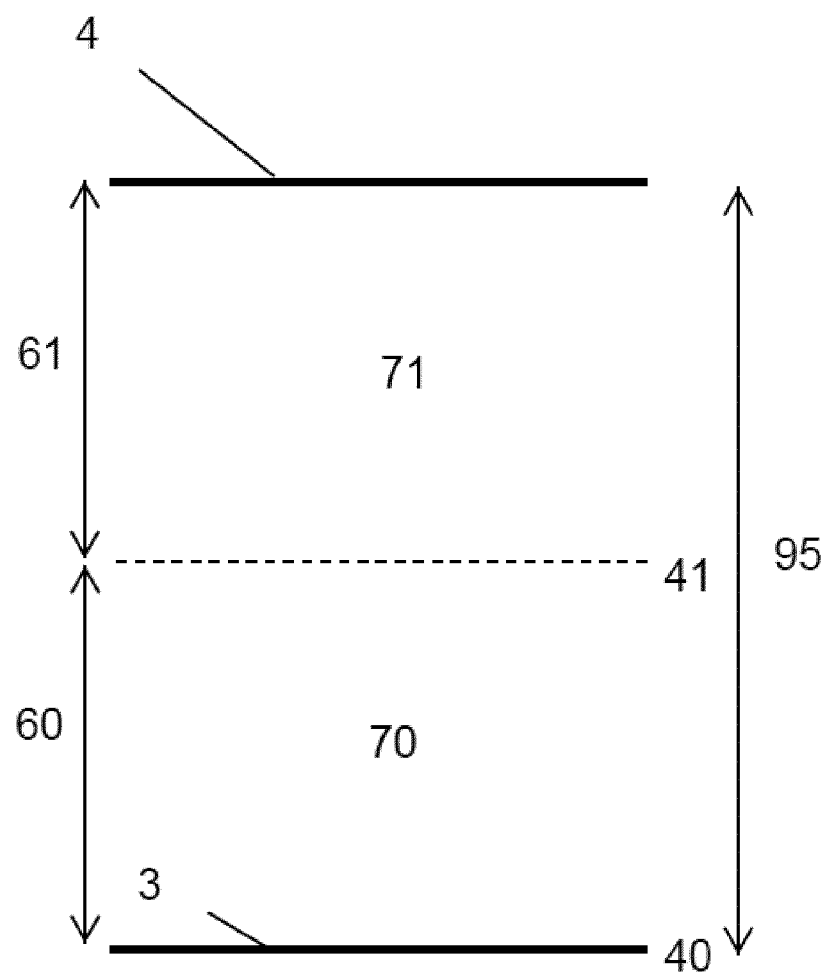
FIG. 12 is a cross section showing an inner surface and an outer surface.

Reference is now made to FIGS. 11 and 12. Here it is shown in cross section a volume of material limited by an inner surface 3 and an outer surface 4. A base line 40, corresponding to the longest part surface of the inner surface 3, is intersecting the inner surface 3. The inner and outer surfaces 3, 4 are spaced apart by a distance 95. In both FIGS. 10 and 11, the volume of material is dived into sub-portions 70-72, where one or more lines 41, 42 represent borders between adjacent sub-portions 70-72. Said line or lines 41, 42 are parallel to, and spaced apart from the base line 40. In FIG. 11, the volume of material is divided or partitioned into three sub-portions 70, 71, 72. In FIG. 12, the volume of material is divided into two sub-portions 70-71. In FIG. 11, the distances 60, 61 are equal to the recommended cutting depth of the turning tool. In FIG. 12, each of the distances 60, 61 are equal to half the distance 95 between the inner and outer surfaces 3, 4. As always, the recommended cutting depth for the turning tool should be understood as the recommended cutting depth of the turning tool with respect to the direction of feed, i.e. the movement of the turning tool.

In FIGS. 11 and 12, distance 95 is 4.3 mm. The recommended cutting depth for the turning tool is 2.0 mm. The minimum and maximum cutting depths for the turning tool is 0.5 and 2.5 mm, respectively. Thus, during the first pass in FIG. 11, when removing the sub-portion 72, the cutting depth is 0.3 mm, which is below the minimum cutting depth of the turning tool. Therefore, the FIG. 11 illustration of dividing the volume of material and tool paths (passes) can be improved, because a cutting depth below the recommended cutting depth of the turning tool may give acceptable results but not optimal results, with respect to e.g. chip breaking.

In FIG. 12 the distances 60, 61 are each 2.15 mm, in other words lower than or equal to the maximum allowed cutting depth of the turning tool and higher than or equal to the minimum cutting depth of the turning tool. Therefore, FIG. 12 is preferred over FIG. 11.

In FIG. 12, the respective cutting depth according to the following:

If m mod a_p≥a_p min is true, then a_p actual=a_p
If m mod a_p≥a_p min is false, then if
m/floor (m/a_p)≤a_p max is true, set
a_p actual=m/floor (m/a_p) and if
m/floor (m/a_p)≤a_p max is false, set
a_p actual=(m−a_p min)/floor (m/a_p)

Here, m is the maximum remaining depth perpendicular to the base line 40, i.e. 4.3 mm. a_p is the is the recommended cutting depth for the turning tool, i.e. 2.0 mm. mod is operator that finds the remainder after division of one number by another. Thus, m mod a_p is 4.3 mod 2.0=0.3. Since 0.3 is smaller than a_p min (the minimum cutting depth for the turning tool), the first statement is false. Therefore, the next step is to calculate m/floor (m/a_p) where floor is a function that takes as input a real number and gives as output the greatest integer less than or equal to said real number. Thus, floor (m/a_p) is equal to floor (4.3/2.0) is equal to floor (2.15) is equal to 2.0, which means that m/floor (m/a_p) is equal to 4.3/2.0=2.15. Since 2.15 is smaller than or equal to 2.5, the expression m/floor (m/a_p) ≤a_p max is true, because a_p max is the maximum cutting depth for the turning tool, which in this example is 2.5 mm. Thus, a_p actual=m/floor (m/a_p) which means that the cutting depth (a_p actual) is set to 2.15. In other words, the line 41 in FIG. 12, which together with the outer surface 4 defines the material removed during the pass, is placed 2.15 below the outer surface in FIG. 12. The same formulas are used to calculate the next pass, and the only difference for the next pass in FIG. 12 is that m is 2.15 mm.

The methods for generating control command data and for dividing a volume of material described are to be understood as computer implemented. Therefore, objects, movements and other entities are to be understood as representations, preferably electronical representations, of such entities.

The invention claimed is:

1. A method performed by a computer numerical control (CNC) lathe including computer program code being configured to cause the CNC lathe at least to perform the method for generating control command data, such as NC-code (numerical control code) for controlling the CNC-lathe to perform a turning operation by means of a turning tool, the method comprising the steps of:
   generating the control command data, such as the NC-code (numerical control code), to control the CNC-lathe to perform the turning operation by means of the turning tool;
   selecting an electronic representation of a metal blank;
   selecting an electronic representation of the turning tool;
   selecting a volume of material from the metal blank to be removed by means of the turning tool, said volume being limited by an inner surface and an outer surface, said metal blank being limited by a peripheral surface, wherein the peripheral surface includes the outer surface;
   selecting the inner surface such that the inner surface includes at least one part surface, which is cylindrical, conical or planar;
   selecting an end position;
   selecting a recommended cutting depth for the turning tool;
   selecting a maximum allowed cutting depth for the turning tool;
   and, based on the above selections, generating control command data to:
   (a) command the turning tool to remove a portion of the volume of material through one or more turning passes, which are linear and parallel to a longest part surface of the inner surface, until a cutting depth at a point of the inner surface, which is most remote from the end position is less than or equal to the maximum allowed cutting depth of the turning tool;
   (b) command the turning tool to go into cut at a point of an unmachined inner surface, which is most remote from the end position; and
   (c) command the turning tool to move along the inner surface towards the end position until:
     a cutting depth is equal to or greater than one of either the maximum allowed cutting depth or the recommended cutting depth, whereby the turning tool is commanded to move away from the inner surface in a predefined direction, which predefined direction is parallel to the longest part surface of the inner surface, or
     the turning tool reaches a predefined position, whereby the turning tool is commanded to move away from the inner surface, the predefined position is defined as an intersection between the inner surface and a line parallel to and spaced apart by a multiple of the recommended cutting depth of the turning tool from a base line, wherein the base line intersects the longest cylindrical, flat or conical part surface of the inner surface.

2. The method according to claim 1, comprising the further step of generating control command data to command the turning tool to, during step (a), perform two or more turning passes, and wherein a maximum cutting depth for the first turning pass is less than a maximum cutting depth for all subsequent turning passes during step (a).

3. The method according to claim 1, comprising the further step of repeating step (c) until the turning tool reaches the end position.

4. The method according to claim 1, comprising the further step of selecting the turning tool such that a minimum cutting depth for the turning tool is less than the cutting depth during step (a) and (c).

5. The method according to claim 1, comprising the further step of generating control command data to command the turning tool during step (c), to move in a direction, which is parallel to or substantially parallel to the longest of the cylindrical, conical or planar part surface.

6. The method according to claim 1, comprising the further step of generating control command data during step (a) to remove material through a sequence of parallel turning passes.

7. The method according to claim 1, comprising the further step of generating control command data to command the turning tool to remove the volume of material in a sequence of turning passes, wherein a maximum cutting depth for the turning pass is greater than a maximum cutting depth for the first turning pass.

8. The method according to claim 7, comprising the further step of generating control command data to command the turning tool in all turning passes to move either radially, without a longitudinal component, or in the same longitudinal direction.

9. The method according to claim 1, comprising the further steps of:
   selecting a chip thickness value for the turning tool; and
   selecting a feed rate such that the feed rate is equal to the chip thickness value divided by the sinus function of an entering angle, wherein the entering angle is defined as an angle between a direction of feed and a main cutting edge of the turning tool.

10. The method according to claim 9, wherein the entering angle is 10-45°.

11. The method according to claim 1, comprising the further step of generating control command data to command the turning tool to reduce a feed rate when going out of cut.

12. The method according to according to claim 1, comprising the further step of generating control command data to command the turning tool to during step (b) go into cut along an arc.

13. The method according to claim 1, comprising the further step of selecting the inner surface such that the inner surface includes a 90° corner.

14. The method according to claim 1, wherein the turning tool includes a tool body and a turning insert mounted in an insert seat of the tool body, wherein the turning insert includes a first cutting edge, a second cutting edge and a convex nose cutting edge connecting the first and second cutting edges, and wherein a nose angle formed between the first and second cutting edges is less than or equal to 85° in a top view.

15. The method according to claim 14, wherein the nose cutting edge has a radius of curvature of 0.2-2.0 mm, and wherein the first and second cutting edges are straight in a top view.

16. A non-transitory computer-readable medium comprising computer program code for generating numerical control code, which when executed by a computer numerical control (CNC) lathe generates command data to cause the computer numerical control lathe to perform the method according to claim 1.

17. The method according to claim 1, wherein the turning tool is commanded to move away from the inner surface as the turning tool reaches the predefined position at a cutting depth greater than or equal to the recommended cutting depth of the turning tool.

* * * * *